March 15, 1949.  J. K. HOLBROOK  2,464,686
PHOTOGRAPHIC COPY HOLDER
Filed July 17, 1945  6 Sheets-Sheet 1
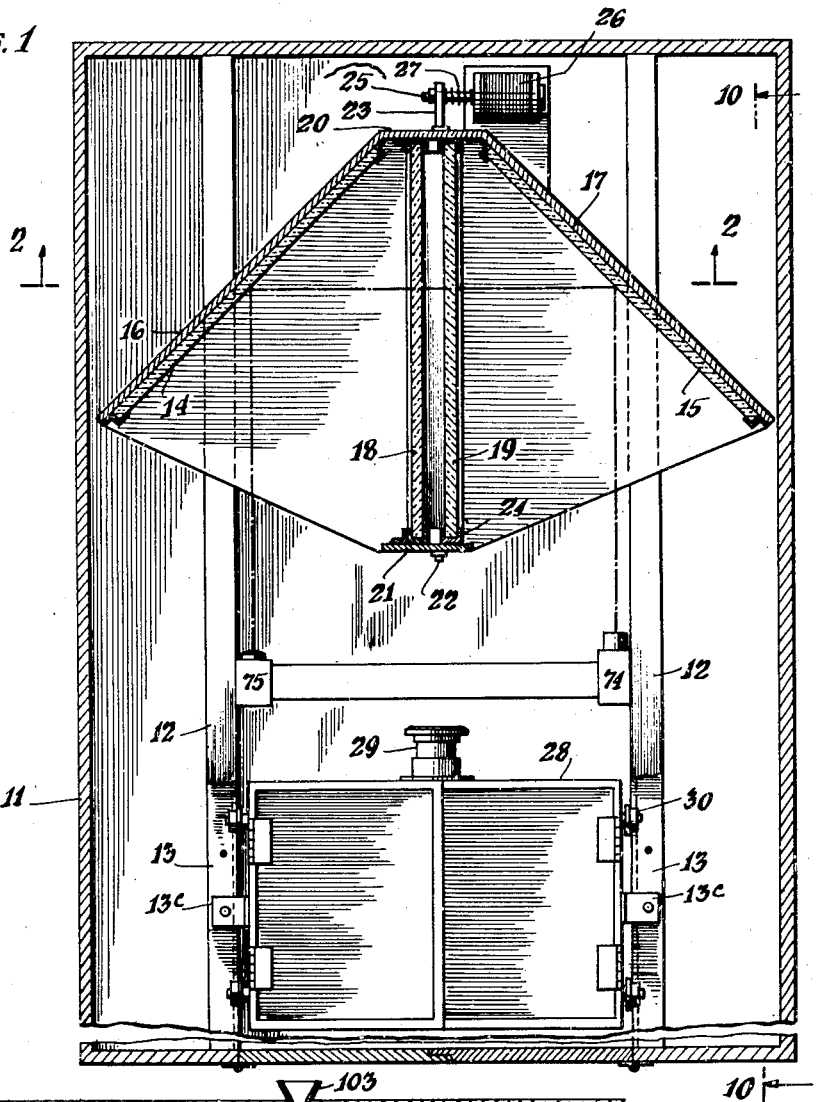
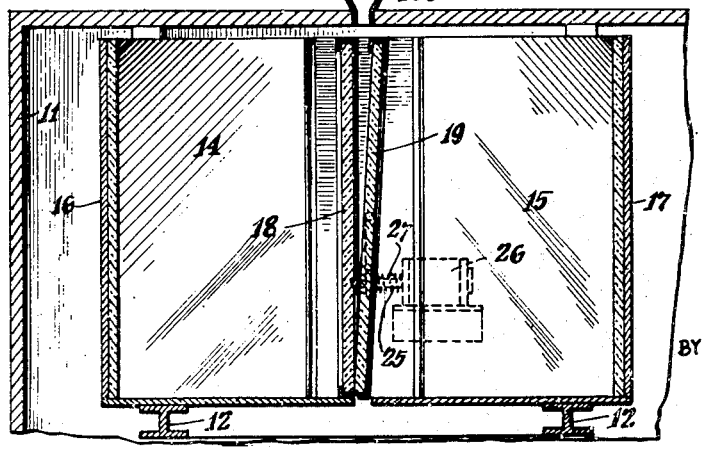
INVENTOR
John K. Holbrook
BY
Hobart M. Durham
ATTORNEY March 15, 1949. J. K. HOLBROOK 2,464,686
PHOTOGRAPHIC COPY HOLDER
Filed July 17, 1945 6 Sheets-Sheet 2
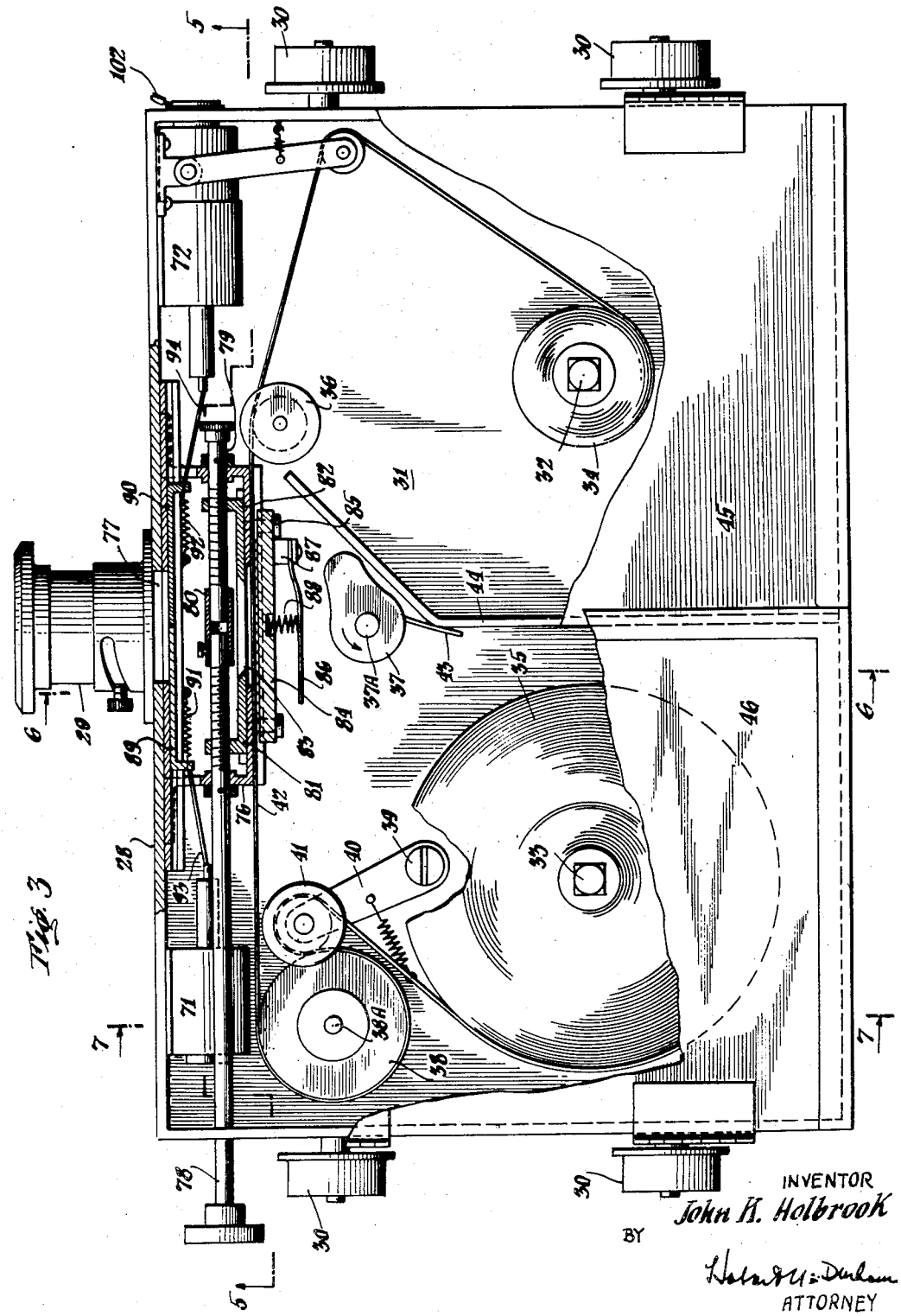
INVENTOR
John K. Holbrook
BY
ATTORNEY

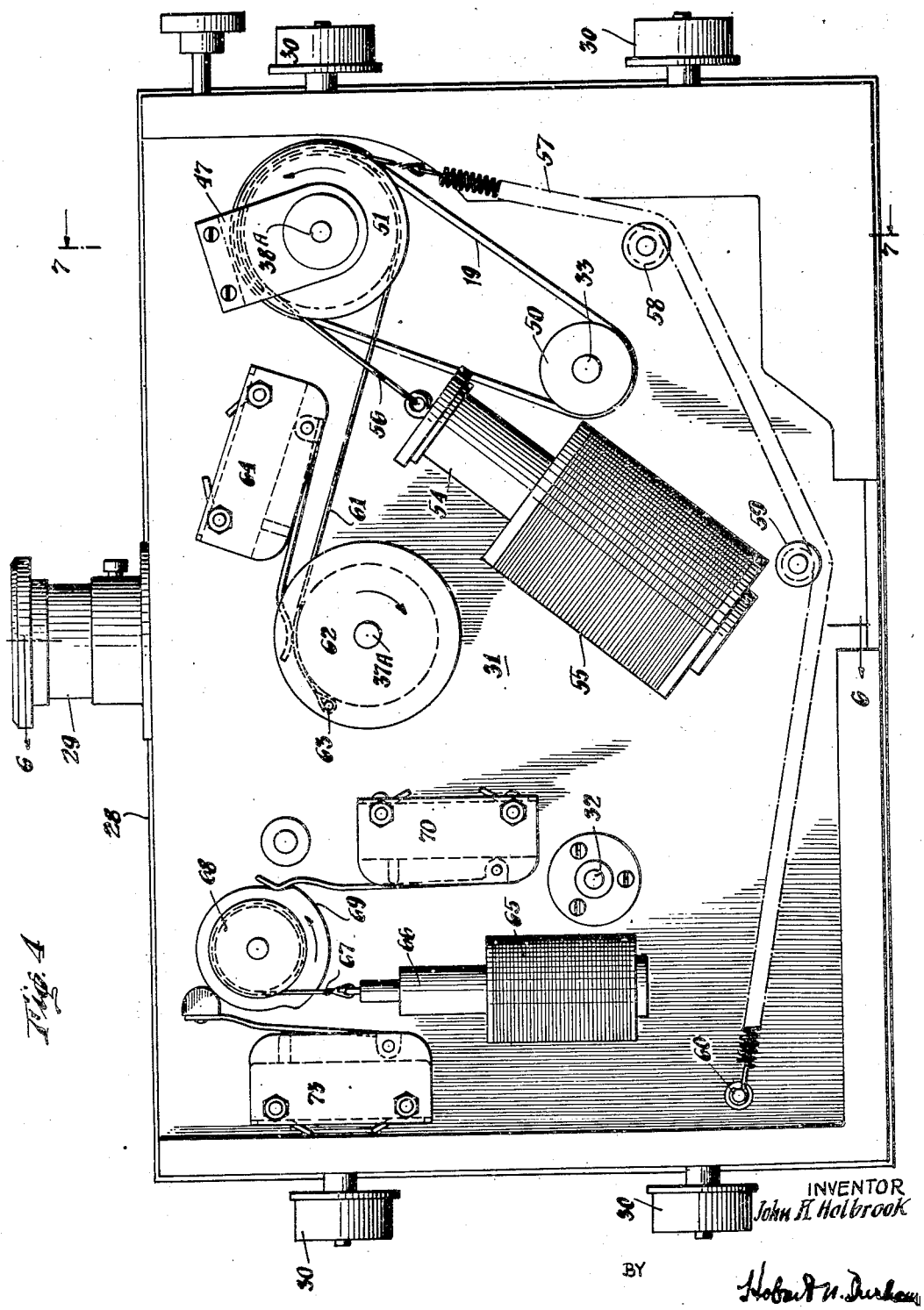

March 15, 1949. J. K. HOLBROOK 2,464,686
PHOTOGRAPHIC COPY HOLDER
Filed July 17, 1945 6 Sheets-Sheet 4
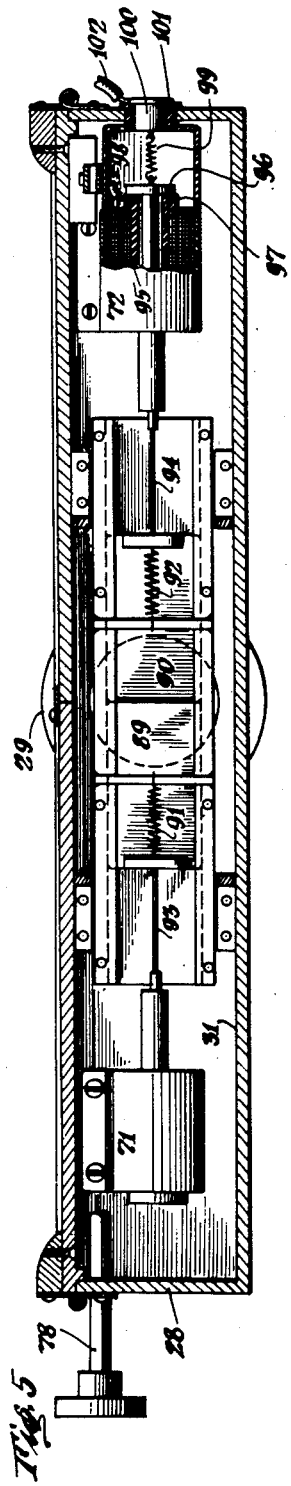
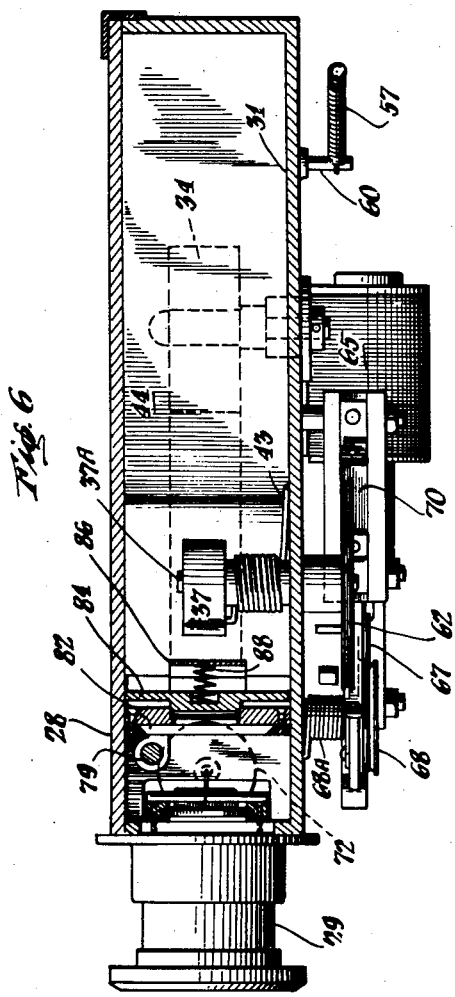
INVENTOR
John K. Holbrook
BY
ATTORNEY

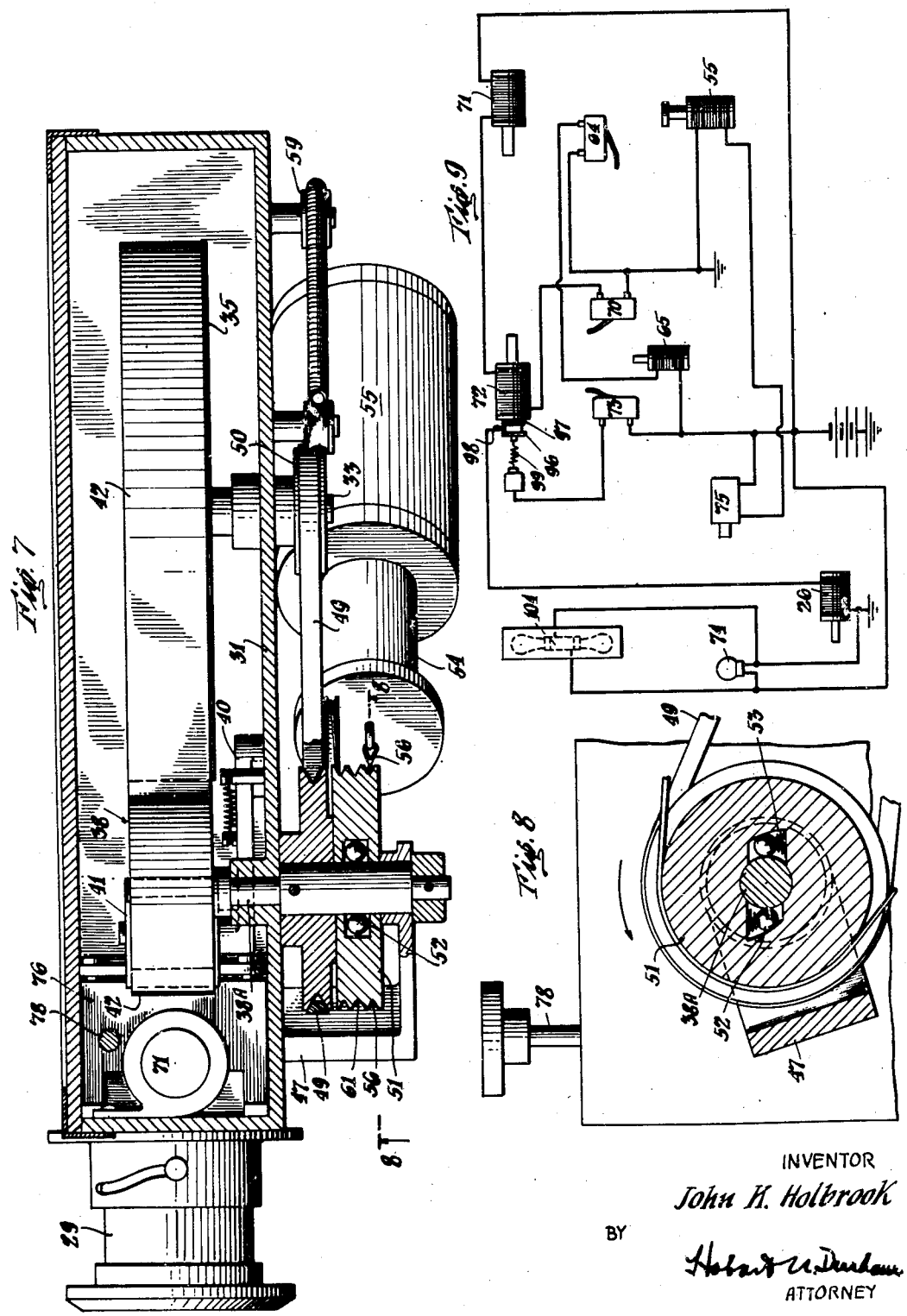

March 15, 1949.　　　　J. K. HOLBROOK　　　　2,464,686
PHOTOGRAPHIC COPY HOLDER

Filed July 17, 1945　　　　　　　　　　　　6 Sheets—Sheet 6

INVENTOR
John H. Holbrook
BY
Hobart N. Durham
ATTORNEY

Patented Mar. 15, 1949

2,464,686

UNITED STATES PATENT OFFICE 2,464,686

PHOTOGRAPHIC COPYHOLDER

John K. Holbrook, New York, N. Y., assignor to Holbrook Microfilming Service Inc., New York, N. Y., a corporation of Delaware Application July 17, 1945, Serial No. 605,498

3 Claims. (Cl. 88—24)

The present invention concerns improvements in recording cameras and refers more particularly to a still camera useful principally in the recording of documents such as bank checks, deeds and the like.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The cammopanying drawings, referred to herein and constituting a part hereof, illustrate one embodiment of the invention, and together with the description, serve to explain the principles of the invention.

Of the drawings:

Figure 1 is a top elevation, partly in section, of a device embodying the present invention;

Figure 2 is a section along the line 2—2 of Figure 1;

Figure 3 is a top elevation, partly in section, of the camera housing;

Figure 4 is a bottom elevation of the device;

Figure 5 is a section along the line 5—5 of Figure 3;

Figure 6 is a section along the lines 6—6 of Figures 3 and 4;

Figure 7 is a section along the lines 7—7 of Figures 3 and 4;

Figure 8 is a section along the line 8—8 of Figure 7;

Figure 9 is a wiring diagram; and

Figure 10:
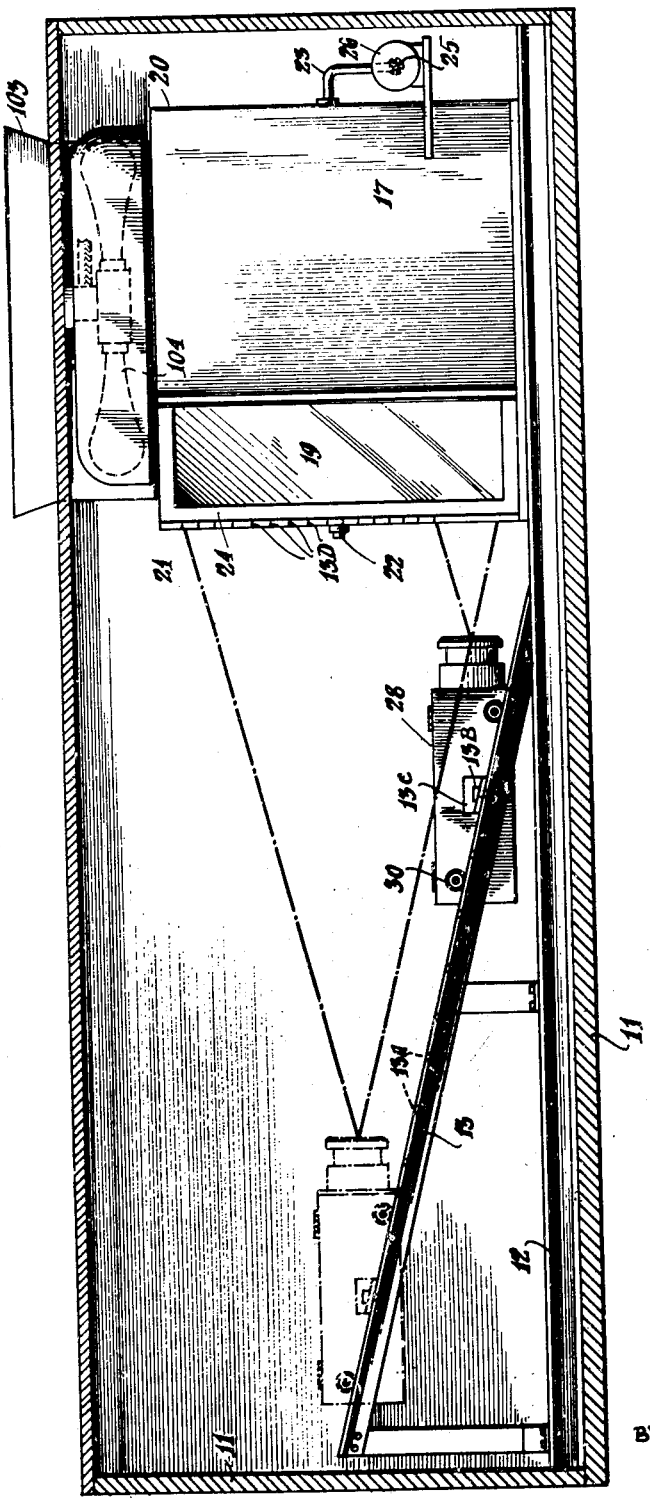
Figure 10 is a section along the line 10—10 of Figure 1.

An object of the present invention is to provide a novel means of positioning the document in the photographic field.

A further object is the provision of photoelectric control means for certain operations of the device, which means will leave the photographic record free of the objectionable "hot spot" caused the exciter beam of the photoelectric cell.

A further object is the provision of means for automatically centering the camera relative to documents of various sizes, as the camera objective is moved to different distances from the copy in order to vary the size of the photographic field.

A further object is the provision of mechanism for automatically performing the various operations involved in a novel and advantageous sequence.

In accomplishing the objects of the present invention there is provided a copy holder comprising two similar glass plates, of which one is fixed in a substantially vertical plane and the second is pivoted on a horizontal axis substantially midway its height and slightly displaced from and approximately parallel to the first. The lower boundary of the second plate is spring urged into contact with that of the first to define an upwardly open slender V shaped copy holding aperture, and is solenoidally retracted to permit gravity discharge of the document.

The above mechanism is adapted to position documents of various sizes in a vertical photographic field with their bottom boundaries at the same height. In order to obtain the largest possible image in each case, the camera proper is moved toward or away from the document, and is mounted on an inclined track so that the various fields of view of the objective at various distances from the document will likewise have their lower boundaries at a common height which coincides with the bottom boundaries of the documents.

A photoelectric cell is responsive to an exciter beam, such as infra red, which is nonactinic with reference to the photographic film used, and this beam intersects the photographic field and may impinge on the document without causing the "hot spot" in the photographic record resulting from the actinic light of the ordinary exciter beam; it being understood that the interrupting of the beam by the document initiates the cycle of operation of the device.

The said cycle of operations is as follows: interruption of the exciter beam energizes the main solenoid of the device, cocking the film winding spring, clamping the film in the gate and closing a switch to a cam solenoid, the cam first closes then opens a switch to solenoids controlling the shutter, exposing the film, and closing a switch to the copy holder solenoid. The latter circuit includes a conductive portion of the shutter mechanism and is only closed upon the return of the shutter to closed position. The second plate is solenoidally pivoted away from the first, the document is discharged by gravity, the exciter beam is restored, the main solenoid is deenergized, the film unclamped, transported by the cocked spring, the switch to the cam solenoid is opened, the cam solenoid deenergized and the cam returned to initial position. As the cam returns it breaks the circuit to the copy holder solenoid, and the second plate is returned against the first by a spring, the copy holder then being ready to receive another document.

It will be understood that the foregoing general description and the following detailed description as well are exemplary and explanatory of the invention but are not restrictive thereof.

Referring now in detail to the illustrative embodiment of the invention as shown in the drawings, a rectangular outer box indicated generally as 11 carries attached to its floor interiorly I beams 12, on which are mounted an inclined camera track 13, mirrors 14, 15 supported on metal or other suitable backing members 16, 17, and two similar glass plates 18, 19 supported in a substantially vertical plane substantially on the central longitudinal line of the box 11. Plate 18 is fixedly supported in standards 20, 21 and plate 19 is pivotally supported by trunnions 22 in standards 20, 21 on a substantially horizontal axis parallel to and slightly displaced from plate 18, and about centrally of the height of the plates 18, 19 on arm 23 extends horizontally from the channel shaped binding 24 of plate 19 to connect with the armature 25 of a solenoid 26, the armature being adapted to be retracted when the solenoid is energized, and being urged into extended position by a spring 27 coiled about it.

The camera proper comprises the light tight box 28 with suitably mounted lens 29 directed so that its optical axis passes horizontally between the plates 18, 19 the box further being mounted on wheels 30 rolling on the inclined track 13, the inclination of which to the horizontal is equal to half the effective angle of view of lens 29 as illustrated in Figure 10. This effective angle is wider than the angle of view of the lens, not illustrated, it being understood that the outermost rays included in the angle of view are incident on the mirror and are reflected to the copy at an angle equal to their angle of incidence to define the effective angle of view. This angle is wider than the angle of view because the rays, after being reflected, have continued their constant angular divergence from the optical axis without the points on the rays, in particular the points of incidence on the copy, having continued a proportional increase in distance from the node measured along a straight line.

It is, of course, evident that in a device in which the copy is positioned normally to the optical axis instead of parallel therewith as herein, the inclination of track 13 to the horizontal would be equal to half the angle of view of the lens.

The track 13 may conveniently be formed with pin holes 13A for receiving pins 13B passing through an angle plate 13C on the exterior of box 28 to position the same at various points along the track, which points may conveniently be located at intervals constituting multiples of the focal length of the lens from the field of view. The lens mount may further be correspondingly calibrated in multiples of diameters of magnification and minification and the standard 21 may be correspondingly calibrated as at 13D to show at a glance the degree of magnification or minification required in order that the image of a given document in the copy holder shall fill the picture area.

The floor 31 of box 28 supports the spindles 32, 33 of the film supply and takeup spools 34, 35 respectively, as well as the spindles of the film guide roller 36, spindle 37A of film clamp cam 37 and spindle 38A of film transport roller 38. A screw 39 threaded into floor 31 has a spindle portion constituting a pivot for the lever 40 of the transport wrap roller 41, which is spring urged into contact with the film 42 on transport roller 38. The clamp cam 37 is actuated by a spring 43 into the inoperative position shown, spring 43 engaging with its free end the partition 44 which divides the interior of box 28 into two roughly similar chambers 45, 46 for film supply and takeup respectively.

Spindle 38A of film transport roller 38 extends through a light tight bushing stud of floor 31 and therebeyond to a further bush at the free end of bush arm 47. Intermediate these two bushes spindle 38A fixedly carries pulley wheel 48 from which belt 49 extends to pulley 50 carried by spindle 33 extending through floor 31 from film takeup spool 35. Also intermediate the bushes spindle 38A carries the multiple sheave 51 comprising a one way clutch mechanism illustrated most particularly in Figure 8, and comprising hardened steel balls 52 spring actuated into contact with spindle 38A toward the reduced ends of apertures formed in sheave 51 centrally thereof and bounded on opposite sides by spindle 38A and arcuate walls 53 converging toward the spindle counterclockwise. Counterclockwise rotation of the spindle is imparted to sheave 51 by frictional contact between the spindle and the balls, while clockwise rotation of the spindle destroys the frictional engagement and is not accompanied by rotation of sheave 51, which is moreover free at all times to rotate clockwise of the spindle.

The armature 54 of main solenoid 55 is connected to a flexible cable 56 led over sheave 51 and connected to the film transport spring 57, which extends over rollers 58, 59 and is anchored to floor 31 as at 60. A flexible cable 61 is anchored to sheave 51 and to pulley 62 mounted on spindle 37A of clamp cam 37, the latter connection being by means of a pin 63 so positioned circumferentially of pulley 62 as to operate the arm of microswitch 64 controlling cam solenoid 65.

To the armature 66 of solenoid 65 is connected flexible cable 67 which is further anchored to cam wheel 68 which is acuated by spring 68A into the position shown. The cam surface 69 of cam wheel 68 is adapted to close micro switch 70 controlling shutter solenoids 71, 72, then to open switch 70, then close micro switch 73 controlling copy holder solenoid 26. The latter is adapted to be actuated by the presence of a document in the copy holder interrupting an exciter beam of nonactinic radiant energy, such as infra red rays originating in the lamp 74 and reflected from mirror 15 through plates 18 and 19 to mirror 14 and photoelectric cell 75.

The shutter mechanism comprises the box 76 mounted interiorly of box 28 and rearwardly of lens 29 and of the lens mounting aperture 77 of box 28, and in communication therewith. Rod 78 extends through corresponding sides of boxes 28 and 76 substantially to meet the lens axis and a further rod 79 joined to rod 78 by sleeve 80 extends therefrom to extend from the far side of box 76. Portions of rods 78 and 79 within box 76 are oppositely threaded and engage the substantially L shaped gate framing leaves 81, 82, which slide longitudinally of box 76 to vary the width of gate aperture 83 formed in the rear wall of box 76. Gate plate 84 slides on pins 85 in a direction parallel to the lens axis to clamp and unclamp film 42 in the focal plane of the lens, being shown in unclamping position. Clamping is effected by cam 37 depressing leaf spring 86 mounted on standard 87, thereby compressing coil spring 88. The shutter leaves 89, 90 slide longitudinally of box 76 and normally to the lens axis, meeting thereat to close the shutter and moving oppositely therefrom to open the same. Leaves 89, 90 are urged into closed position by springs 91, 92 and are connected by cables 93, 94 to the solenoids 71, 72. The armature of solenoid 72 slides in a fiber or other insulating sleeve 95 and its head 96 forms a contact with contact 97 connected as at 98 to the circuit of copy holder solenoid 26. Spring 99 connected to head 96 is conductive and is connected through conductive post 100 set in insulating material 101 to the circuit of solenoid 26 as at 102, the contacts 96, 97 being subsequent in the circuit to micro switch 73.

The operation of the device is as follows, beginning with the film spools loaded and threaded and on unexposed portion of film in the gate:

Before switching on any current in the camera a document is dropped through chute 103 and falls between the glass plates 18, 19 coming to rest with its bottom boundary substantially parallel with the bottom boundary of the slender V shaped aperture defined by the plates and being maintained in such position by the convergence of plate 19 to plate 18 at this point in height as illustrated in Figure 2. The first calibration 13D above the top of the document will show the degree of magnification or minification at which the image of the document will fill the picture area of the film 42 in gate aperture 83, so the camera is rolled to the correspondingly calibrated position 13A on track 13, pinned there by pin 13B and the lens 29 focused, also by means of the corresponding calibrations. No further attention to image size or lens focus is necessary while photographing documents of the same size, and it will be noted that the correct height of the camera relative to the field of view has been maintained at all times by the inclination of track 13.

When current is turned on in the electrical system, the source 104 of actinic light and the nonactinic exciter beam source 74 are both energized and so remain as long as the current is on. The exciter beam being interrupted by the document, the photo electric cell 75 develops no resistance and the current passes to main solenoid 55 which by means of cable 56 rotates one way clutch sheave 51 in the direction of the arrow and simultaneously cocks film transport spring 57. Also simultaneously cable 61 rotates pulley 62 in the direction of the arrow and pin 63 closes microswitch 64, energizing cam solenoid 65, the revolution of pulley 62 having rotated cam 37 in the direction of the arrow to contact leaf spring 86 and compress coil spring 88 against gate plate 84 to clamp film 42 in the gate.

Cam solenoid 65 by means of cable 67 rotates cam wheel 68 in the direction of the arrow, the cam curface 69 closing microswitch 70 to energize shutter solenoids 71, 72, opening shutter leaves 89, 90, exposing the film in gate aperture 83. As soon as solenoid 72 is energized head contact 96 leaves contact 97 opening the circuit to copy holder solenoid 26. As cam wheel 68 continues to rotate the rear end of surface 69 passes from under the arm of switch 70, deenergizing solenoids 71, 72, the springs 91, 92 snap the shutter leaves 89, 90 closed, and the contacts 96, 97 come together closing the circuit between switch 73 and solenoid 26. The front end of surface 69 then closes switch 73, solenoid 26 is energized, plate 19 is swung away from plate 18 and the document is discharged by gravity.

The exciter beam is thereupon restored, the resistance in photocell 75 goes up, breaking the circuit to main solenoid 55, sheave 51 and pulley 62 commencing to rotate opposite to the arrows under the influence of springs 57 and 43 respectively. Instantaneously the film is unclamped by rotation of cam 37 opposite to the arrow, switch 64 is opened, deenergizing cam solenoid 65 and commencing the transporting of film 42 by rotation of film transport roller 38 and take up spool 35 under the pull of spring 57.

The deenergizing of cam solenoid 65 opens the circuit to copy holder solenoid 26 in series therewith, solenoid 26 being deenergized and plate 19 returned against plate 18 by spring 27. Cam wheel 68 is returned to the illustrated position by spring 68A, the operation of switch 70 by the returning cam surface 69 being inoperative to operate the shutter solenoid as switch 70 is in series with main solenoid 55 which is in deenergized condition.

Dropping another document in chute 103 to interrupt the exciter beam re-initiates the cycle of operation.

It will be noted that the duration of exposure depends on the length of surface 69 of cam wheel 68, and though as described above contacts 96, 97 open and close before switch 73 closes to operate solenoid 26, a longer exposure may be obtained by using a wheel 68 with a longer surface 69, in which case the switch 73 would be closed before the exposure was complete, but the circuit to solenoid 26 would remain open until the shutter leaves 89, 90 had closed, seating the contacts 96, 97 to close the circuit. A double provision is thus made against premature operation of solenoid 26 to discharge the document.

The oppositely threaded rods 78, 79, joined by the sleeve 80 have an effect on leaves 81, 82 which they threadedly engage which is analogous to that of a turnbuckle, in that rotation of rod 78 serves to draw them apart for varying the length of film 42 exposed in gate 83. If for any reason an asymmetrical disposition of the leaves is desired relative to the lens axis, the setscrew of sleeve 80 is loosened and the rods are separately adjusted, after which on tightening the setscrew the leaves will maintain their asymmetrical setting and may both be adjusted by rod 78 as before.

There is thus provided a recording camera which discloses to an inexperienced operator the proper degree of minification or magnification for documents of various sizes and provides height, distance and lens focus settings correspondingly calibrated so that in the exercise of ordinary care the operator cannot fail to obtain sharp focus and centering of the image on the film. The cycle of operations is completely automatic, being initiated by the interruption of the exciter beam and requiring no attention from the operator except the feeding of documents, as long as documents of the same size are being handled. The nonactinic exciter beam impinges on the document during exposure without causing the "hot spot" or over-exposed area caused by the impingement of an actinic exciter beam as commonly used in the art.

The invention in its broader aspects is not limited to the specific mechanisms shown and described but departures may be made therefrom within the scope of the accompanying claims without departing from the principles of the invention and without sacrificing its chief advantages.

What is claimed is:

1. In a photographic recording device, a copy holder comprising a substantially vertically supported transparent plate and a second similiar plate pivotally supported on a substantially horizontal axis intermediate its upper and lower ends, said axis being parallel and adjacent to, and fixed with reference to said first mentioned plate, said second plate being swingable on said axis toward said first plate to define a slender V-shaped copy holding aperture and further being swingable away therefrom to discharge copy contained in said aperture.

2. In a photographic recording device, a copy holder comprising a substantially vertically supported transparent plate and a second similiar plate pivotally supported at the same height on a fixed, substantially horizontal axis at a height substantially midway the height of said plates, said axis being parallel to and slightly displaced from said first mentioned plate, and means for swinging said second plate on said axis toward said first mentioned plate to define a slender V-shaped copy holding aperture and for swinging said second plate away from said first plate to discharge by gravity copy contained in said aperture.

3. In a photographic recording device, a copy holder comprising a substantially vertically supported transparent plate and a second similar plate pivotally supported at the same height on a fixed, substantially horizontal axis at a height substantially midway the height of said plates, means for swinging the pivoted plate, said axis being parallel and slightly displaced from said first mentioned plate, photoelectric means adapted to actuate camera means for photographing a document upon detecting the presence of such document in said aperture, means adapted to operate said plate swinging means upon the completion of the photographic exposure to discharge said document, said means for swinging said second plate toward said first plate being adapted to operate immediately following said discharge.

JOHN K. HOLBROOK.

REFERENCES CITED

The following references are of record in the file of this patent:

UNITED STATES PATENTS

| Number | Name | Date |
|---|---|---|
| 1,391,807 | Swalm et al. | Sept. 27, 1921 |
| 1,801,458 | Satterlee | Apr. 21, 1931 |
| 1,993,178 | Mitchell et al. | Mar. 5, 1935 |
| 2,168,190 | Busse | Aug. 1, 1939 |
| 2,176,573 | Hershberg | Oct. 17, 1939 |
| 2,194,808 | Pooley, Jr. | Mar. 26, 1940 |
| 2,217,120 | Liebman | Oct. 8, 1940 |
| 2,219,458 | Sohns | Oct. 29, 1940 |
| 2,251,570 | Hessert | Aug. 5, 1941 |
| 2,291,006 | Stuart | July 28, 1942 |